March 23, 1943.  E. LJUNGSTROM  2,314,452
HERMETICALLY SEALED CAN
Filed Dec. 12, 1939
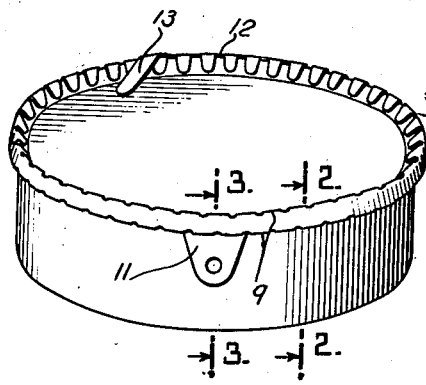
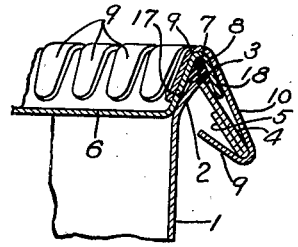
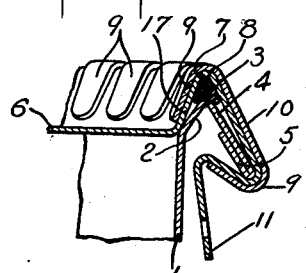
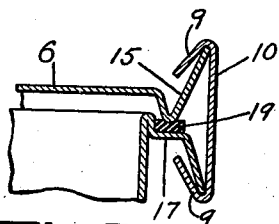
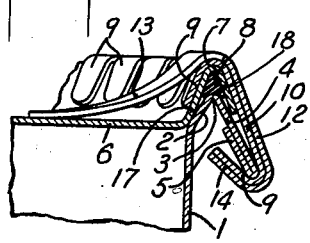
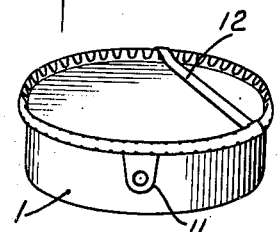
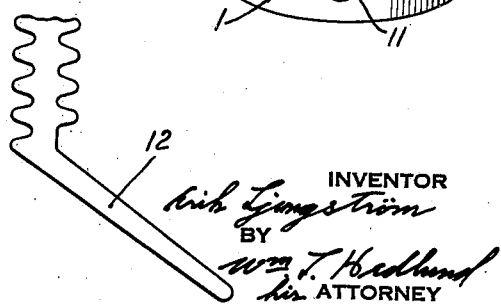

UNITED STATES PATENT OFFICE 2,314,452

HERMETICALLY SEALED CAN

Erik Ljungstrom, Lidingo, Sweden

Application December 12, 1939, Serial No. 308,759
In Sweden December 19, 1938

2 Claims. (Cl. 220—61)

This invention relates to hermetically sealing devices for tin cans provided with covers, united to the receptacle by means of a sealing strip.

According to the invention the cover, as well as the receptacle is provided with flanges of such a shape that projections of a sealing strip, applied to the flanges, when pressed down over the flanges of the cover and the receptacle will form angles of less than 90°.

The invention is illustrated in the accompanying drawing. Fig. 1 is a perspective view of a tin can with a sealing device according to the invention, Fig. 2 is a partial section taken on the line II—II of Fig. 1 and Fig. 3 a section taken on the line III—III of Fig. 1. Fig. 4 is a fragmentary section of a can, somewhat different in shape, and Figs. 5–7 illustrate means to facilitate the disengagement of the sealing strip when opening the can.

In the drawing, 1 indicates the side wall of the body of the receptacle, the upper part 2 of which is bent downwards constituting a flange 4 in a relatively sharp angle 3 substantially forming a V-section. The edge of this flange is preferably turned backwards as indicated at 5. The edge of the cover 6 is provided with a flange 17, bent upwards, the outer part 18 of this flange preferably being bent downwards as shown in Fig. 2 forming a part 7 substantially of V-shape in section. To insure a tight seal between the cover and the side wall of the receptacle a gasket 8 of rubber or the like may be inserted therebetween.

A sealing device consisting of a metal strip provided with projections 9 is arranged around the can at the joint between the cover and the receptacle, and is pressed over the flanges of the cover and receptacle edges. According to the invention the part 17 of the cover flange, bent upwards, forms such an angle with the part 4 of the receptacle flange, bent downwards, that the projections 9 of the sealing strip, when pressed tightly against said flange parts of the cover and the receptacle, will form angles less than 90° with the center part 10 of the strip.

By this construction it results that the forces caused by an excess of pressure inside the receptacle will act against points very near the center part of the sealing strip. Thus there is no risk that the projections will be straightened by said forces.

To enable the manual removal of the strip for opening of the receptacle without using tools the strip is provided with a part 12 without projections and a tongue 13 easily removably attached to an edge of the closed receptacle, by means of a projection on the tongue 13.

The cover may be provided with a tongue 11 to be used as a handle when removing the cover from the receptacle.

Fig. 4 illustrates another construction of the cover and receptacle flanges where the V-shaped flange 15 is arranged as a downwards pointing angle between a plain surface 17 of the cover and the sealing strip. The V-shaped flange 15 acts against a gasket 19 applied at the surface 17 of the receptacle.

Figs. 5, 6 and 7 illustrate a construction of the end of the sealing strip not provided with projections, serving the purpose of making the opening procedure easy. In Fig. 5 the end of the sealing strip, also illustrated in Fig. 1, with the tongue 13 and the projection 14 is shown in detail.

In Figs. 6 and 7 the end 12 of the strip not provided with projections is laid across the receptacle and bent over the edge of the receptacle in the manner shown. For this purpose the strip is made in accordance with Fig. 7.

I claim:

1. In a device of the class described, a sheet metal container having an open top, a sheet metal cover therefor, a conical flange extending upwardly and outwardly around the periphery of said cover and terminating in a thin edge, a conical flange extending downwardly and outwardly from said container around the opening therein and terminating in a thin edge, and a removable sheet metal sealing strip including a central portion with projections extending from either side thereof, said projections being bent over the respective flanges, said flanges being arranged at such an angle to each other that said projections form angles of less than 90° with said central portion, said projections engaging the thin edges of the flanges immediately adjacent to the apexes of the last mentioned angles.

2. In a device of the class described, a sheet metal container having an open top, a sheet metal cover therefor, a conical flange extending upwardly and outwardly around the periphery of said cover and terminating in a thin edge, a conical flange extending downwardly and outwardly from said container around the opening therein and terminating in a thin edge, a removable sheet metal sealing strip including a central portion with projections extending from either side thereof, said projections being bent over the respective flanges, said flanges being arranged at such an angle to each other that said projections form angles of less than 90° with said central portion, said projections engaging the thin edges of the flanges immediately adjacent to the apexes of the last mentioned angles, one end of the central portion of said sealing strip being extended to form a handle for removing the sealing strip, and a tongue connected to the extended portion and bent over one of said flanges for retaining said extended portion in place.

ERIK LJUNGSTROM.